United States Patent [19]
Cilia

[11] Patent Number: 5,509,961
[45] Date of Patent: Apr. 23, 1996

[54] MEDIUM BED MORTAR

[76] Inventor: Ross Cilia, 265 Hoover Drive, Pickering, Ontario, Canada, L1V 5R9

[21] Appl. No.: 193,652

[22] Filed: Feb. 7, 1994

[51] Int. Cl.$^6$ ........................................ C04B 14/20
[52] U.S. Cl. ...................... 106/716; 156/63; 156/71; 52/389
[58] Field of Search ........................ 106/675, 678, 106/716, 719, 724, 725, 727, 728, 802, 819, 822, 823; 427/403; 156/63, 71; 52/389, 745.21, 746

[56] References Cited

U.S. PATENT DOCUMENTS

| | | | |
|---|---|---|---|
| 4,142,911 | 3/1979 | Ellis et al. | 106/736 |
| 4,280,848 | 7/1981 | Ellis et al. | 106/716 |
| 5,185,389 | 2/1993 | Victor | 106/802 |

*Primary Examiner*—Paul Marcantoni

[57] ABSTRACT

The present invention provides for a medium bed mortar for setting of large tiles. The mortar comprises from 25 to 75 parts by weight of a mortar base composition and 1 part by weight of expanded vermiculite. The presence of the vermiculite in the mortar base supports the trowel ridges of the medium bed mortar of more than ⅜ inch to ⅝ of an inch in height and increases the open time of the medium bed mortar to allow longer working times. In an aspect of the invention there is provided a method for setting of tile on a supporting surface. The method comprises trowelling onto the supporting surface a medium bed mortar composition comprising from about 25 to 75 parts by weight of a mortar base composition and 1 part by weight of expanded vermiculite by means of a ridged trowel to produce ridges of the medium bed mortar composition of greater than ¼ inch in height and setting the tile in the medium bed mortar to adhere the tile to the supporting surface. The presence of the vermiculite in the mortar base supports the trowel ridges and increases the setting time of the medium bed mortar to allow longer working times.

15 Claims, No Drawings

MEDIUM BED MORTAR

FIELD OF THE INVENTION

The present invention relates to medium bed mortar for setting of large tiles particularly large ceramic, granite, marble and the like floor tile.

BACKGROUND OF THE INVENTION

At present floor and wall tiles particularly ceramic, granite, marble and other types of floor and wall tile are attached to a supporting surface with the use of a thinset mortar which acts to adhere the tile to the supporting surface. Such thinset mortars are particularly suitable for tile up to about 12 inches square. Thinset mortars are generally trowelled onto the surface using a ridged trowel which provides for ridges approximately ⅜ to ⅝ inch in height. When the tile is set into this mortar bed, the ridges permit the air to escape from under the tile and also provide for areas into which the mortar may spread when the tile is set. Owing to the increased surface area of large tiles, thinset mortars are generally not suitable for direct application to a surface with such large tiles. In order to compensate for the possible unevenness in the supporting surface and the size of the tile, ridges larger than the ⅜ inch to ⅝ inch range may be required. At the present time, currently available thinset mortars do not appear to be capable of supporting a ridge of mortar of greater than approximately ⅜ inch to ⅝ inch in height. Rather, the mortar tends to sink down into the groove which may result in the formation of air pockets under the surface of the tile and thereby reduce the adherance of the tile to the mortar bed. If tiles larger than those typically secured with thinset mortar are desired to be set on a supporting surface, they generally require the use of a medium bed mortar which allows for a thicker mortar layer to be applied to the supporting surface. When it is desired to install such larger tiles, a mortar bed is generally prepared which involves the attachment of a wire mesh to the supporting surface. The mesh is then covered with a thin layer of scratch coat mortar. Once the scratch coat mortar is cured in approximately twenty-four hours then a thinset mortar can be applied on top using a ridged trowel and the tiles set on this thinset mortar. The purpose of the scratch coat mortar is to provide for a level surface on which to spread the thinset mortar, set the tile and to provide for strengthening of the mortar bed for proper adherence of the tiles to the supporting surface.

SUMMARY OF THE INVENTION

The present invention provides for a medium bed mortar for setting of large tiles. This mortar comprises a mortar base composition and expanded vermiculite the thin-set mortar composition and vermiculite being present in a weight ratio of about 25 to 1 to about 75 to 1 respectively. The presence of the vermiculite in the mortar base supports the trowel ridges of the medium bed mortar of more than ⅜ inch to ⅝ of an inch in height and increases the open time of the medium bed mortar to allow longer working times for the person installing the tiles.

In an aspect of the invention there is provided a method for setting of tile on a supporting surface. The method comprises trowelling onto the supporting surface a medium bed mortar composition comprising a mortar base composition and expanded vermiculite the thin-set mortar composition and vermiculite being present in a weight ratio of about 25 to 1 to about 75 to 1 respectively, by means of a ridged trowel to produce ridges of the medium bed mortar composition of greater than ⅜ inch to ⅝ inch in height and setting the tile in the medium bed mortar to adhere the tile to the supporting surface. The presence of the vermiculite in the mortar base supports the trowel ridges and increases the open time of the medium bed mortar to allow longer working times.

DETAILED DESCRIPTION OF THE INVENTION

The present invention provides for a medium bed mortar for setting of large tiles. Such large tiles may be large ceramic, granite, marble or similar floor tiles of dimensions of 12 inches on a side or greater or may be ceramic, granite, marble or similar wall and countertop tiles of such dimensions. The medium bed mortar comprises from about 25 to 75 parts by weight of a mortar base composition and 1 part by weight of expanded vermiculite. Preferably, the medium bed mortar comprises from about 33 to 67 parts by weight of a mortar base composition and 1 part by weight of expanded vermiculite, more preferably 50 parts by weight of a mortar base composition and 1 part by weight of expanded vermiculite. The presence of the vermiculite in the mortar base supports the trowel ridges of the medium bed mortar of more than ⅜ inch to ⅝ of an inch in height and increases the open time of the medium bed mortar to allow longer working times for the person installing the tiles. Open time is the amount of time before a dry surface or skin forms on the mortar. A dry surface or skin on the mortar prior to setting the tile in the mortar bed can lead to poor bonding between the tile and the mortar bed. An increase in open time allows the user to spread a larger area of mortar with less chance of drying before laying the tile. The medium bed mortar of the present invention has an open time at room temperature of about 50% greater than the mortar base composition itself.

The mortar base composition for use in the invention may be any typical mortar base, preferably a thinset mortar base. Such thinset mortar base generally includes a mortar or cement such as, for example, Portland cement, a filler such as sand or other fine particulate matter and an adhesive which is generally a polymeric substance to increase the bond strength between the ceramic tile and the mortar and the mortar and the supporting surface. Such adhesives may be, for example, epoxy, cynoacrylates or methacrylates, rubbers, urethanes or other such polymers water based adhesives. Such thinset mixtures are generally used by combining with water to prepare a composition of the proper stiffness and then applied to the supporting surface.

The medium bed mortar of the present invention is preferably provided by mixing expanded vermiculite in the proper ratio in the dry state with the dry powder thinset mortar. The mixing may be achieved by any of the typical means, such as a blade mixer, etc. This mixture of the mortar base and the vermiculite may then be packaged for later use and maintained in a moisture-free condition.

The medium bed mortar of the present invention is utilized by hydrating it through the addition of sufficient water to provide a mixture of the proper constituency for spreading on the supporting surface. It has been found that, owing to the presence of the vermiculite in the medium bed mortar, the amount of water added to the medium bed mortar mixture is generally in excess of that which would typically have been added to the mortar base itself because of the absorbtiveness of the vermiculite. This also accounts for the fact that the open time of the mortar is longer than conventional mortars. It has generally been found that 1 part by weight of water is added to from about 3 to 5 parts by weight of the medium bed mortar, preferably 1 part by weight of water to 3.5 to 4.5 parts by weight of the medium bed mortar, most preferably 1 part by weight of water to 4.2 parts by weight of the medium bed mortar. This results in a composition having the proper constituency for spreading on the supporting surface to produce ridges of greater than about 3/8 inch to 5/8 inch in height.

The medium bed mortar of the present invention comprising the vermiculite and the mortar base offers the advantage of a softer more malleable mortar than the base itself. The medium bed mortar is also better able to support trowel ridges facilitating installation of floor tiles onto uneven surfaces through the use of higher ridges. The bonding between the floor tiles and the adhesives and between the adhesives and the supporting surfaces is strengthened as the medium bed mortar is more elastic and shrinkage is reduced compared with the mortar base without the vermiculite. The medium bed mortar of the present invention is more versatile in that it can be more effectively used both indoors and outdoors and in low temperatures in variable thicknesses so as to level uneven floors and can be used in areas in which thinset can not presently effectively be used. The medium bed mortar of the present invention is easier to spread compared with the water base vermiculite as the presence of the vermiculite allows for increased moisture and may act to allow for easier sliding of the mortar though the grooves of the trowel.

The invention and its advantages will now be illustrated by the following non-limiting example.

EXAMPLE 25 kg of 52 or 53 floor mix thinset mortar obtained from Flextile Limited was mixed with 0.5 kg of expanded vermiculite having an average particle size of between 1/8 of an inch and 1/4 of an inch. To this mixture was added 6 kg (6 liters) of water. After mixing, the medium bed mortar was applied to a supporting surface comprising a 5/8 inch plywood deck. For comparison purposes, a mixture of the thinset mortar itself prepared in accordance with the manufacturer's instructions was applied to a further supporting surface. Both mortar beds were applied using a ridged trowel to result in a mortar bed having ridges averaging 5/8 inch in height. The two mortar beds were compared for integrity of the ridges and for the setting time of the mortar bed. It was found that the ridges of the thinset mortar alone tended to slump into the groove fairly quickly while the ridges of the medium bed mortar prepared in accordance with the present invention retained their raised ridge shape. In addition, it was found that the medium bed mortar had open times on the order of about 50% longer that of the thinset mortar itself.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A medium bed mortar dry mix for preparation of a medium bed mortar for setting of large tiles comprising a dry powdered thin-set mortar composition and an expanded vermiculite of an average particle size of 1/4 inch to 1/8 inch, the thin set mortar composition and vermiculate being present in a weight ratio of about 25 to 1 to about 75 to 1 respectively, the presence of the vermiculite in the medium bed mortar dry mix increasing the open time of the medium bed mortar prepared therefrom to allow longer working times.

2. A medium bed mortar according to claim 1 wherein the weight ratio of the thin-set mortar composition to vermiculite is between about 67 to 1 to 33 to 1.

3. A medium bed mortar according to claim 2 wherein the weight ratio of the thin-set mortar composition to vermiculite is 50 to 1.

4. A medium bed mortar according to claim 1 wherein the thin-set mortar composition comprises a mixture of cement, fine particulate filler and an adhesive.

5. A medium bed mortar according to claim 4 wherein the cement is portland cement.

6. A medium bed mortar according to claim 5 wherein the fine particulate filler is sand.

7. A medium bed mortar according to claim 6 wherein the adhesive is a polymeric composition selected from the group of epoxy, cynoacrylates, methacrylates, rubbers, or urethanes.

8. A method for setting of a large tile on a supporting surface comprising hydrating a medium bed mortar dry mix composition comprising a thin-set mortar composition and expanded vermiculite, the thin-set mortar composition and vermiculite being present in a weight ratio of about 25 to 1 to about 75 to 1 respectively, trowelling the medium bed mortar onto the supporting surface by means of a ridged trowel to produce ridges of the medium bed mortar composition of greater than 3/8 inch to 5/8 inch in height, and setting the tile in the medium bed mortar to adhere the tile to the supporting surface, the presence of the vermiculite in the mortar base supporting the trowel ridges and increasing the open time of the medium bed mortar to allow longer working times.

9. A method according to claim 8 wherein the weight ratio of the mortar composition to vermiculite is between about 67 to 1 to 33 to 1.

10. A method according to claim 9 wherein the weight ratio of the thin-set mortar composition to vermiculite is 50 to 1.

11. A method according to claim 10 wherein the thin-set mortar composition comprises a mixture of cement, fine particulate filler and an adhesive.

12. A method according to claim 11 wherein the cement is portland cement.

13. A method according to claim 12 wherein the fine particulate filler is sand.

14. A method according to claim 13 wherein the adhesive is a polymeric composition selected from the group of epoxy, cynoacrylates, methacrylates, rubbers, or urethanes.

15. A method according to claim 14 wherein the tile is selected from the group consisting of ceramic, granite or marble floor tiles.

* * * * *